(12) United States Patent
Lee

(10) Patent No.: US 8,418,490 B2
(45) Date of Patent: Apr. 16, 2013

(54) CONTROLLING METHOD OF AIR CONDITIONING SYSTEM FOR VEHICLES

(75) Inventor: Jeong-Hoon Lee, Daejeon-si (KR)

(73) Assignee: Halla Climate Control Corp., Daejeon (KR)

( * ) Notice: Subject to any disclaimer, the term of this patent is extended or adjusted under 35 U.S.C. 154(b) by 991 days.

(21) Appl. No.: 10/570,390

(22) PCT Filed: Sep. 3, 2004

(86) PCT No.: PCT/KR2004/002245
§ 371 (c)(1),
(2), (4) Date: Oct. 27, 2006

(87) PCT Pub. No.: WO2005/021300
PCT Pub. Date: Mar. 10, 2005

(65) Prior Publication Data
US 2007/0039340 A1   Feb. 22, 2007

(30) Foreign Application Priority Data
Sep. 3, 2003   (KR) .......................... 10-2003-0061493

(51) Int. Cl.
B60H 1/32 (2006.01)
F25B 7/00 (2006.01)

(52) U.S. Cl.
USPC ................................. 62/244; 62/175; 62/239

(58) Field of Classification Search ................ 236/91 C; 62/227, 180, 186
See application file for complete search history.

(56) References Cited

U.S. PATENT DOCUMENTS

| 3,805,539 | A | * | 4/1974 | Burgel et al. .................... 62/148 |
| 4,417,618 | A | * | 11/1983 | Yoshimi et al. ................ 165/204 |
| 4,617,986 | A | * | 10/1986 | Kobayashi et al. .............. 165/42 |
| 4,685,508 | A | * | 8/1987 | Iida ................................. 165/204 |
| 4,941,525 | A | * | 7/1990 | Ito et al. .......................... 165/202 |
| 5,117,646 | A | * | 6/1992 | Nose et al. ....................... 62/181 |
| 5,209,079 | A | * | 5/1993 | Kajino et al. .................... 62/180 |
| 5,275,012 | A | * | 1/1994 | Dage et al. ....................... 62/208 |
| 5,775,415 | A | * | 7/1998 | Yoshimi et al. ................ 165/202 |
| 6,212,893 | B1 | * | 4/2001 | Ban et al. ......................... 62/117 |

(Continued)

FOREIGN PATENT DOCUMENTS
DE   19826730   12/1998
DE   10051582   5/2001

(Continued)

OTHER PUBLICATIONS

PCT/KR2004/002245 Search Report mailed Dec. 22, 2004.

*Primary Examiner* — Ljiljana Ciric
*Assistant Examiner* — Alexis Cox
(74) *Attorney, Agent, or Firm* — Lowe, Hauptman, Ham & Berner, LLP

(57) ABSTRACT

A method for controlling a vehicular air conditioning system including: setting up a target indoor temperature of a vehicle determined by a user; inputting inside and outside temperatures of the vehicle and solar radiation with reference to a sensor mounted on the vehicle; calculating a target discharge temperature of a vent (t1); inputting the maximum evaporator temperature (t2); setting up a target evaporator temperature by comparing t1 and t2; calculating the opening degree of a temperature control door; measuring actual evaporator temperature while controlling the discharge capacity of a compressor; calculating the opening degree of the temperature control door by using the actual opening degree of the compressor discharge capacity control valve and the actual evaporator temperature.

16 Claims, 7 Drawing Sheets

U.S. PATENT DOCUMENTS

| | | | |
|---|---|---|---|
| 6,269,650 B1 * | 8/2001 | Shaw | 62/176.6 |
| 7,172,018 B2 * | 2/2007 | Katou et al. | 165/204 |
| 7,201,219 B2 * | 4/2007 | Ieda et al. | 165/202 |
| 2002/0053601 A1 * | 5/2002 | Kamiya et al. | 236/49.3 |
| 2002/0139862 A1 * | 10/2002 | Tsunoda et al. | 236/91 C |
| 2003/0097852 A1 * | 5/2003 | Tomita et al. | 62/244 |
| 2007/0079621 A1 * | 4/2007 | Lee et al. | 62/228.4 |

FOREIGN PATENT DOCUMENTS

| | | |
|---|---|---|
| DE | 10129290 | 4/2002 |
| JP | 61-77518 | 4/1986 |
| JP | 2-3520 | 1/1990 |
| JP | 05-147421 A | 6/1993 |
| JP | 5-278432 | 10/1993 |
| KR | 1991-14251 A | 8/1991 |
| KR | 1998-66164 A | 9/1998 |
| KR | 2002-0080980 A | 9/2002 |

* cited by examiner

Prior Art

Prior Art

Prior Art

CONTROLLING METHOD OF AIR CONDITIONING SYSTEM FOR VEHICLES

RELATED APPLICATIONS

The present application is based on, and claims priority from, KR Application Number 10-2003-0061493, filed Sep. 3, 2003, and PCT Application Number PCT/KR04/002245, filed Sep. 3, 2004, the disclosures of which are hereby incorporated by reference herein in their entireties.

TECHNICAL FIELD

The present invention relates to a controlling method of air conditioning system for vehicles, which can provide improved rate of fuel consumption by optimizing the capacity control in a compressor with variable capacity as well as provide pleasantly air-conditioned inside (interior) environment of a vehicle.

BACKGROUND ART

Typical structure of an air conditioning system for a vehicle equipped with a compressor with variable capacity comprises, as represented by FIG. 1 of the present invention, a compressor, a condenser, an expansion valve, an evaporator, a control valve for controlling output of the compressor, and a valve control module for the control valve according to various detected values. The valve control module measures various values such as the outlet port temperature of an evaporator and speed, inside temperature and outside (exterior) temperature of the vehicle, etc., thereby to adjust the displacement of the control valve.

A compressor used in an air conditioning system for a vehicle is a part that compresses a gaseous refrigerant discharged from the evaporator under low pressure and discharges to a condenser the refrigerant which is highly pressurized so as to be easily liquefied. An example of a commonly used compressor is a swash plate type compressor. In such a swash plate type compressor, a piston that compresses the refrigerant in a compressing chamber while moving reciprocally depending on the rotation of a swash plate is loaded therein.

The structure of a typical swash type compressor (C), as illustrated in FIG. 2, comprises: a front and a rear housing (20) (30) which form a closed space inside such as a crank chamber (21), an intake chamber (30a) and a discharge chamber (30b); a cylinder block (70) which comprises a plurality of cylinder bores (not represented) arranged in circumferential direction and is installed between the front housing (20) and the rear housing (30); a driving shaft (40) that passes through the center of the front housing (20) to be inserted to the crank chamber (21) while being rotatably supported in the center of the cylinder block (70); a plate (50) being rotatably connected to the driving shaft (40) depending on the rotation of the driving shaft (40) in the crank chamber (21); a swash plate (60) that is mounted surrounding the driving shaft (40), is rotatably coupled to the plate (50) so that, depending on the rotation of the plate (50), it can be rotated while being slid in the axial direction of the driving shaft (40) to vary its inclination angle; a plurality of pistons (10) which are coupled with a shoe (62) provided along the circumference of the swash plate (60) to conduct reciprocal movement in each bore of the cylinder block (70) depending on the rotation of the swash plate (60); a valve unit (not represented) that is provided between the cylinder block (70) and the rear housing (30); a control valve (90) for adjust the feed amount of the piston (10); and a spring (80) which is elastically mounted between the plate (50) and the swash plate (60) so as to support the swash plate (60) at the minimum inclination angle when the plate (50) is not rotated.

A means for controlling the output of such swash type compressor is a control valve (90) that adjusts the feed amount of the piston (10), and the control valve (90) is also controlled according to the relation between the discharge pressure and the intake pressure of the compressor, or the displacement of the control valve (90) can be controlled according to the duty ratio of the electric current on excitation coils.

As for other means to control the displacement of a control valve (90), Japanese patent laid-open Nos. 2001-227825 and 2001-227826 disclose a method for forming a map table of a target temperature (referred as refrigerant capacity) that is corresponding to an evaporator outlet temperature (or referred as refrigerant capacity) and a duty ratio of the electric current for achieving the target temperature (or referred as refrigerant capacity). In those laid-opens, the control of the output of a compressor with variable capacity is conducted by driving the control valve according to the current duty ratio corresponding to the measured evaporator outlet temperature in the map table.

As another example related to the control of a control valve, Japanese patent laid-open No. 2001-153425 discloses a method for controlling a compressor control valve according to the lower control value determined by comparing a PID controlling method or a map controlling method.

Further, a method for controlling a control valve by measuring the inside temperature in addition to measurement of the evaporator outlet temperature or refrigerant capacity is also well known in this art.

Figure 1:
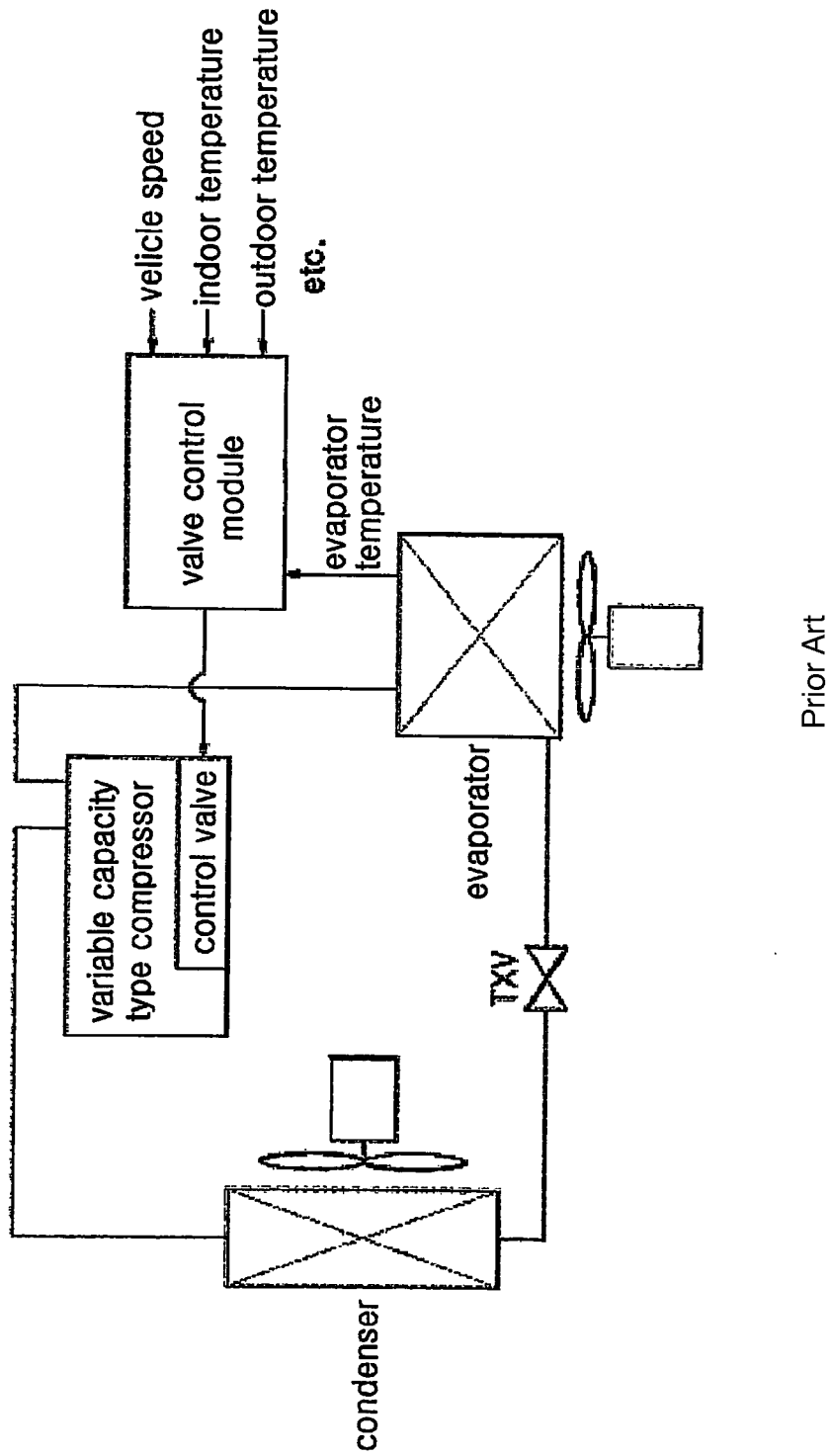

In a mode as shown in FIG. 4a which controls the duty value (duty(t)) of a control valve with a refrigerant discharge capacity (q(t)) as a feedback value, a numerical analysis on the air conditioning system as well as a number of complicating sensor inputs for measuring the refrigerant capacity are required, and the inside temperature is likely to be unstable.

Further, in a mode as shown in FIG. 4b which controls the duty value (duty(t)) of a control valve with a discharge temperature (T.sub.discharge(t)) as a feedback value, the control mechanism is complicated since the control valve adjustment is involved with the inside temperature control. It means that a lot of independent control variables such as an opening degree of a control valve and an opening degree of a temperature control door and the like should be concerned, thereby making the control difficult.

In a mode as shown in FIG. 4c which controls the duty value (duty(t)) of a control valve with an inside temperature (T.sub.incar(t)) as a feedback value, responding properties are greatly decreased and temperature control becomes unstable due to excessive delay time. In addition to those problems, an operational load in the compressor would be likely to fluctuate excessively.

Specifically, a conventionally used mechanical control valve utilizes the discharge pressure and the intake pressure of a compressor in its control mechanism. In such mechanical control valve, the actual evaporator temperature is used only by a predetermined cut-off value for preventing icing on the evaporator, therefore it is impossible to carry out fine control over air conditioning.

A conventional external input-type control valve that controls the discharge capacity of a compressor according to various vehicle information such as driving information inputted from ECU of the vehicle, can improve the rate of fuel consumption, however it has problems such as a complicated structure owing to use of a circuit or a sensor which is required for taking the inputted information such as acceleration or decrease in speed, engine condition and velocity, etc., and additional cost for building such circuit or sensor.

DISCLOSURE OF THE PRESENT INVENTION

The present invention has been designed to solve those above-mentioned problems of prior arts. Specifically, the objects of the present invention are to reduce the number of constitutional parts required for collecting vehicle information and to optimize the discharge capacity of a variable capacity type compressor with, thus improving the rate of fuel consumption as well as providing pleasantly air-conditioned environment.

The controlling method of air conditioning system for vehicles according to the present invention is characterized by comprising the steps of: setting up a target inside temperature of a vehicle determined by a user; detecting and inputting the inside and the outside temperature of the vehicle and solar radiation with referencing to a sensor mounted on a certain position of the vehicle; calculating a target discharge temperature (T1) of a vent by using the target inside temperature, the inside and the outside temperature of the vehicle and solar radiation; inputting the maximum evaporator temperature (T2); setting up a target evaporator temperature by comparing the T1 with the T2; calculating the opening degree of a temperature control door depending on the target evaporator temperature; measuring the actual evaporator temperature while controlling the discharge capacity of a compressor according to the target evaporator temperature, and transmitting the actual evaporator temperature to a certain step; calculating an output value of each operation part by using the actual evaporator temperature and the opening degree of the temperature control door determined by the target discharge temperature; and outputting the resulted output value of the operation part.

In the above, the step of measuring the actual evaporator temperature while controlling the discharge capacity of a compressor according to the target evaporator temperature, and transmitting the actual evaporator temperature to a certain step is characterized by comprising the steps of: inputting the target evaporator temperature; calculating the target control value for a discharge capacity control valve of a compressor by using the target evaporator temperature; outputting the target control value for a discharge capacity control valve to the discharge capacity control valve; adjusting the discharge capacity with the discharge capacity control valve and then measuring the actual evaporator temperature; transmitting the actual evaporator temperature to a step following after the step of inputting the target evaporator temperature and the step of calculating the opening degree of the temperature control door.

Further, the step of inputting the maximum evaporator temperature (T2) is characterized in that the maximum evaporator temperature (T2) is calculated and inputted depending on the temperature of air flowed into the evaporator at the minimum operation of the compressor.

The step of inputting the maximum evaporator temperature (T2) is characterized in that mapping data that have been pre-mapped through performance tests on major control factors are used in the input process.

The step of setting up a target evaporator temperature is characterized in that the target evaporator temperature is determined by comparing the target discharge temperature (T1) and the maximum evaporator temperature (T2): when T1<T2, T1 being determined as the target evaporator temperature; and when T1>T2, T2 being determined as the target evaporator temperature.

The controlling method of an air conditioning system according to the present invention further comprises a step of calculating a target discharge heat of a vent following after the step of detecting and inputting the inside and the outside temperature of a vehicle and solar radiation with referencing to a sensor mounted on a certain position of the vehicle.

In the step of calculating the target discharge temperature (T1) of a vent following after the step of calculating a target discharge heat of a vent, the air volume of the vent is also calculated.

Provided that the temperature difference between the target evaporator temperature and the actual evaporator temperature is more than the acceptable value by comparing both temperatures, the method of the present invention is characterized by further comprising a step of re-calculating the opening degree of the temperature control door, following after the step of calculating the opening degree of the temperature control door according to the target evaporator temperature, The acceptable value of the temperature difference between the target evaporator temperature and the actual evaporator temperature is preferably less than 4.degree. C.

In another embodiment, the controlling method of air conditioning system for vehicles according to the present invention is also characterized by comprising the steps of: setting up a target inside temperature of a vehicle determined by a user; detecting and inputting the inside and the outside temperature of the vehicle and solar radiation with referencing to sensors mounted on certain positions of the vehicle; calculating a target discharge temperature (T1) of a vent by using the target inside temperature, the inside and the outside temperature of the vehicle and solar radiation; inputting the maximum evaporator temperature (T2); setting up a target evaporator temperature by comparing the T1 with the T2; calculating the opening degree of a temperature control door according to the target evaporator temperature; controlling the discharge capacity of a compressor according to the target evaporator temperature.

BRIEF DESCRIPTION ON DRAWINGS

FIG. 1 is a schematic view of a conventional air conditioning system for a vehicle equipped with a variable capacity type compressor.

Figure 2:
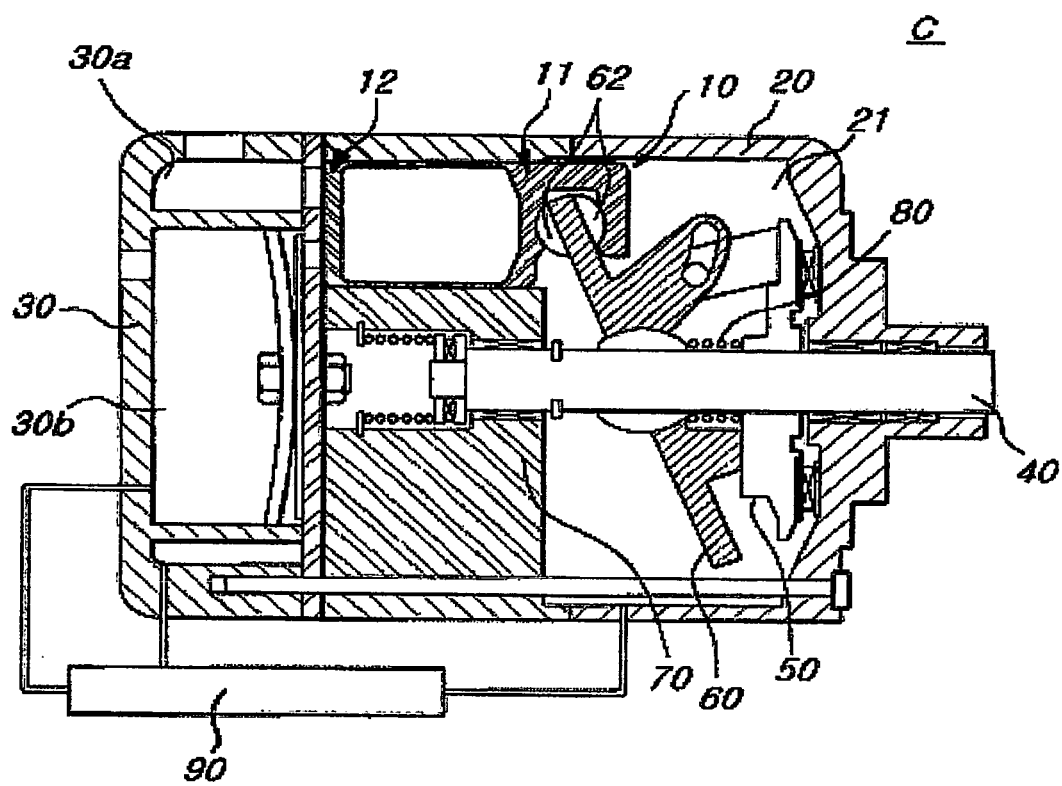

FIG. 2 shows the general structure of a variable capacity type compressor.

Figure 3:
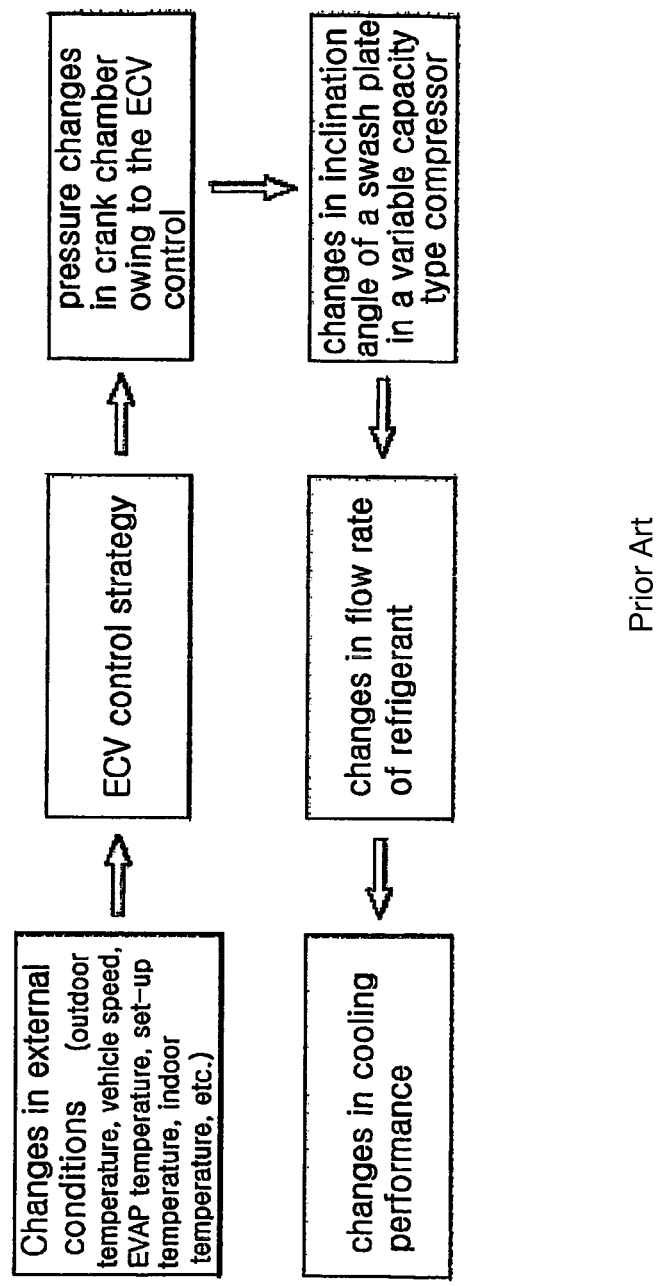
FIG. 3 illustrates, as described above, a variable mechanism of cooling performance of an air conditioning device through control over a control valve.

FIG. 3 is a block diagram concerning a variable mechanism in air-cooling performance of an air conditioning system through a control over a control valve.

Figure 4:
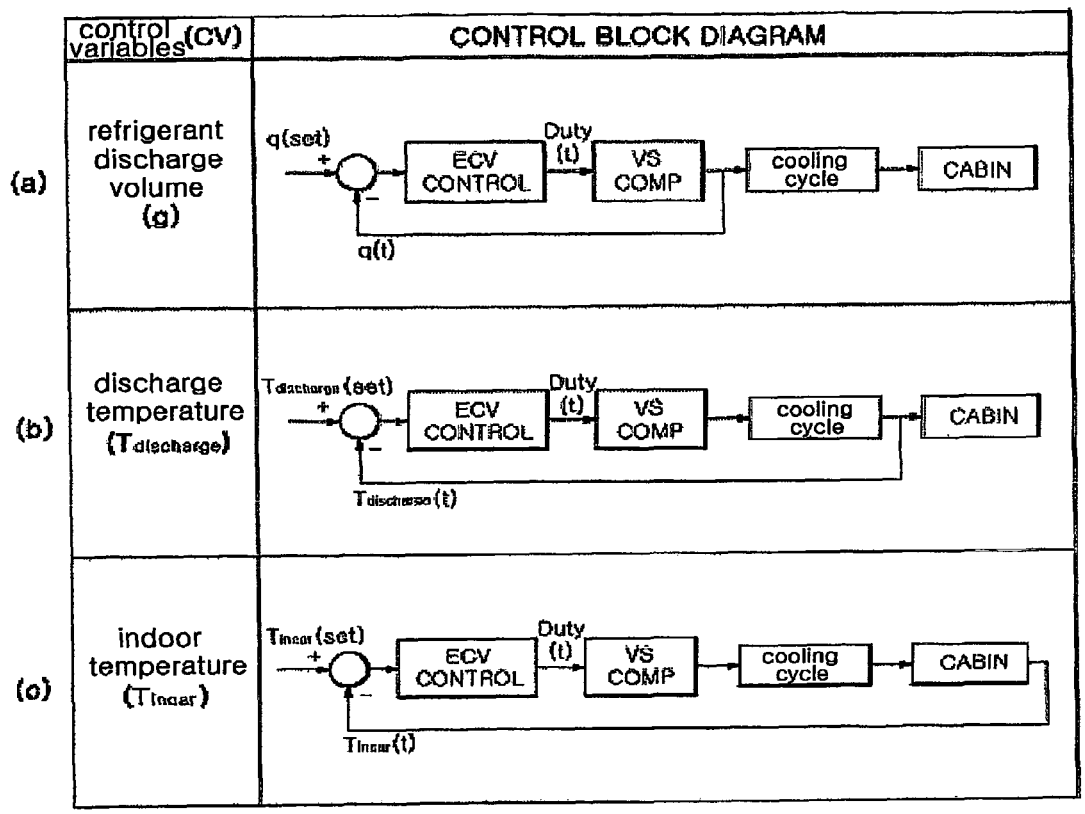
FIGS. 4a, 4b and 4c represent a block diagram of controlling the duty value (duty (t)) of a control valve according to a feedback value determined by measuring refrigerant discharge capacity (q(t)), discharge temperature (T.sub.discharge(t)) and inside temperature (T.sub.incar(t)).

FIG. 4 is a control block diagram concerning the control of duty value (duty (t)) of a control valve according to feedback values determined by measuring the refrigerant discharge capacity (q(t)), the discharge temperature (T.sub.discharge (t)) and the inside temperature (T.sub.incar(t)).

Figure 5:
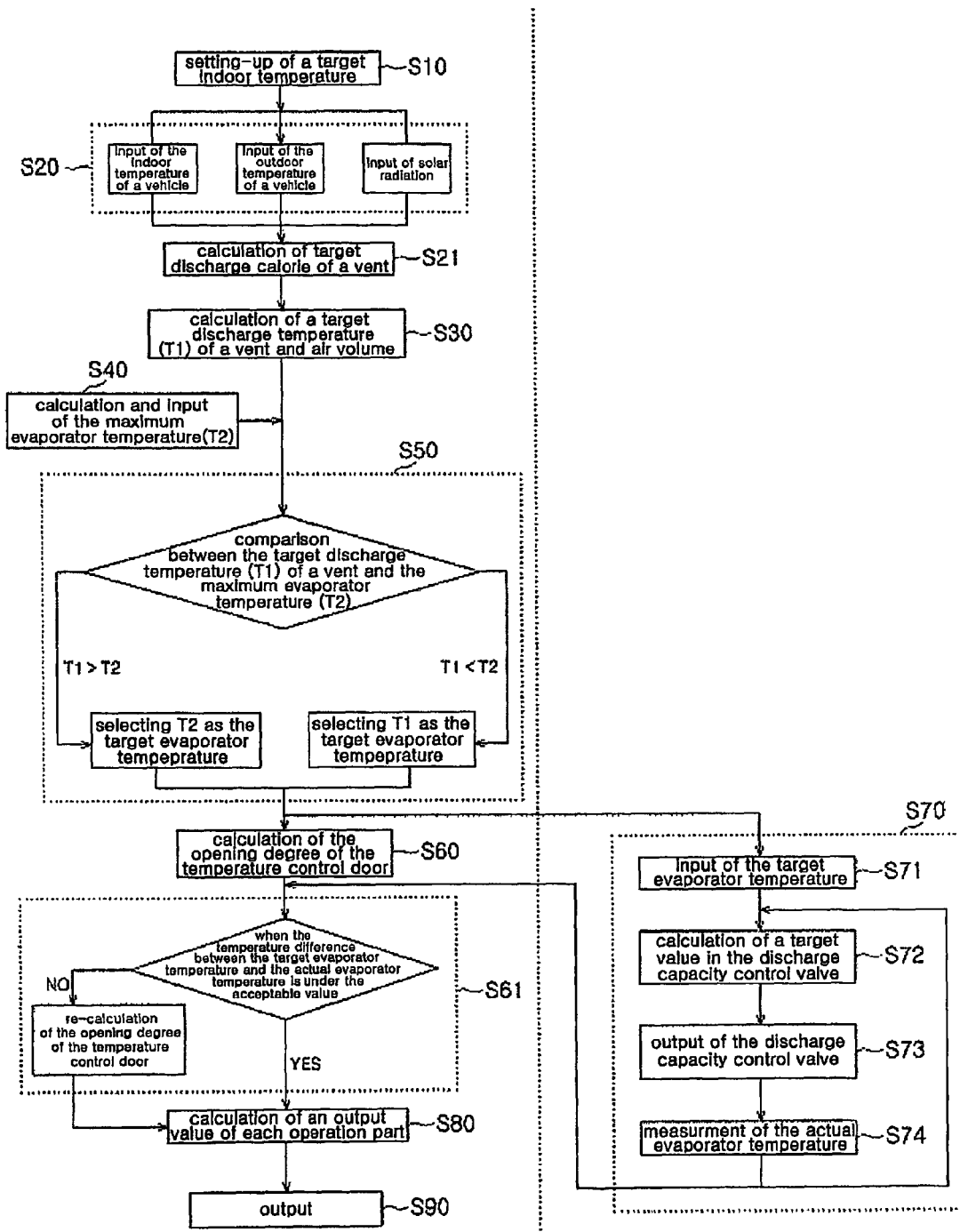

FIG. 5 is a flow chart showing the controlling method of an air conditioning system for a vehicle according to the present invention.

Figure 6:
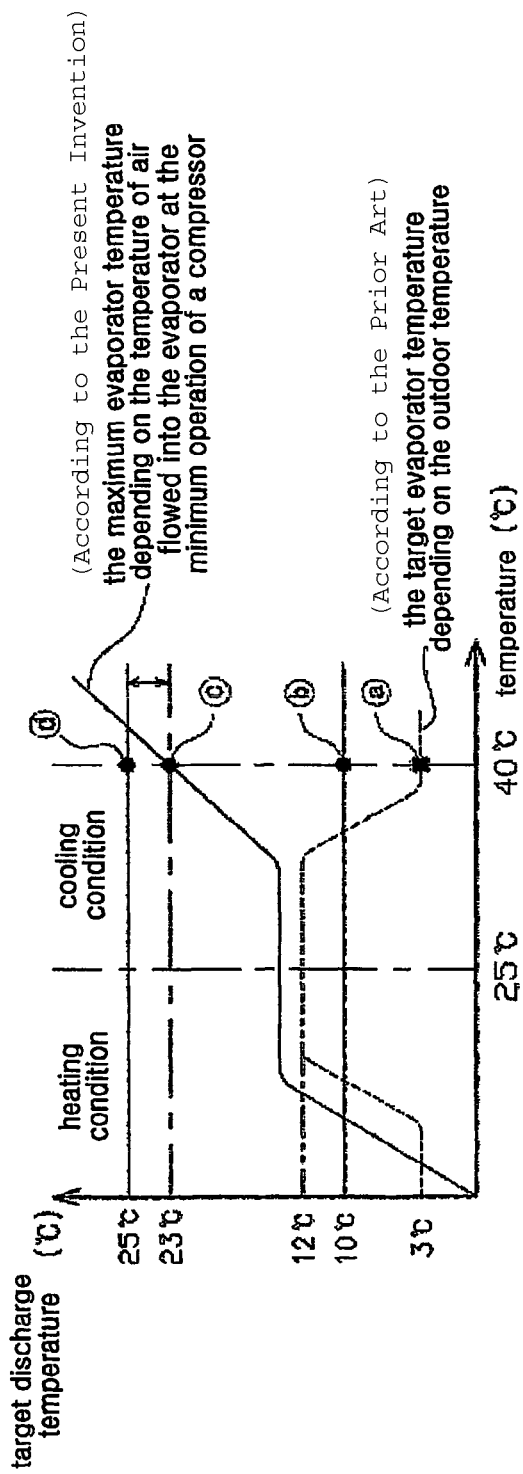

FIG. 6 is a plot showing the relation between the target discharge temperature and the maximum evaporator temperature depending on the temperature of air flowed into the evaporator at the minimum operation of the compressor.

Figure 7:
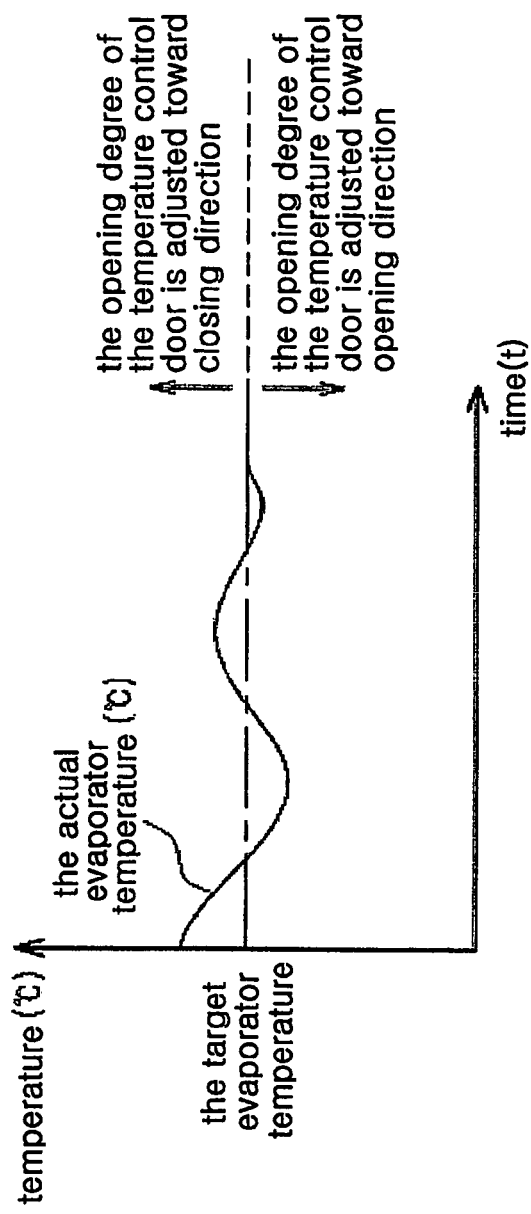

FIG. 7 is a plot showing, when the temperature difference between the actual evaporator temperature and the target evaporator temperature is more than an acceptable value, a process of correcting the opening degree of the temperature control door.

EMBODIMENTS OF THE PRESENT INVENTION

Hereinafter, preferred examples of the present invention are described further in detail, with a reference to the drawings attached to the present specification. FIG. 5 is a flow chart representing a controlling method of an air conditioning system for a vehicle according to the present invention; FIG. 6 is a plot showing the relation between the target discharge temperature and the maximum evaporator temperature depending on the temperature of air flowed into the evaporator at the minimum operation of the compressor; and FIG. 7 is a plot showing, when the temperature difference between the actual evaporator temperature and the target evaporator temperature is more than an acceptable value, a process of correcting the opening degree of the temperature control door.

According to the controlling method of an air conditioning system for a vehicle of the present invention, as disclosed by FIG. 5, a user at first, sets up a target inside temperature of the vehicle (S10), and then the inside and the outside temperature of the vehicle and solar radiation detected from a sensor that is mounted on a certain position of the vehicle are inputted (S20). According to those inputted inside temperature and the outside temperature of the vehicle and solar radiation in S20, a target discharge heat of a vent is calculated (S21), then based on the resulted target discharge heat, a target discharge temperature (T1) and an air volume are calculated (S30). The step of calculating the target discharge heat of the vent (S21) may be omitted, and in the step of S30, the air volume may also be excluded from the calculation thus determining only the target discharge temperature (T1) of the vent. Then, the maximum evaporator temperature (T2) is inputted (S40) depending on the temperature of air flowed into the evaporator at the minimum operation of the compressor. Next to the step, the target discharge temperature (T1) and the maximum evaporator temperature (T2) are compared each other to select the smaller value, which is set up as a target evaporator temperature (S50). According to the selected target evaporator temperature, the opening degree of the temperature control door (Temp. Door) is calculated (S60), and the actual evaporator temperature is measured and transmitted to a certain step, while control over the discharge capacity of a compressor is carried out according to the target evaporator temperature. An output value of each operation part is calculated by using the actual evaporator temperature and the opening degree of the temperature control door determined by the target evaporator temperature (S80), and then the resulted output value of the operation part is outputted (S90).

When the temperature difference between the target evaporator temperature and the actual evaporator temperature is more than an acceptable value, it is preferred to comprise a step of re-calculating the opening degree of the temperature control door further.

In the step (S70) of measuring the actual evaporator temperature while controlling the discharge capacity of a compressor according to the target evaporator temperature, and transmitting the actual evaporator temperature to a certain step, the target control value for a discharge capacity control valve of a compressor is calculated (S72) by using the determined target evaporator temperature and outputted (S73) thereby to measure the actual evaporator temperature (S74). Thus measured actual evaporator temperature is transmitted to a step following after the step (S60) of calculating the opening degree of the temperature control door and a step following after the step (S71) of inputting the target evaporator temperature. When the temperature difference between the actual evaporator temperature and the target evaporator temperature is under the acceptable value, the operation output value is immediately calculated, but when the temperature difference between them is more than the acceptable value, re-calculation of the opening degree of the temperature control door is followed by the calculation of the output value of the operation part. The acceptable value of the temperature difference is preferably not more than 4.degree. C.

The relation between the target discharge temperature and the maximum evaporator temperature is described hereinafter, with referencing FIG. 6. In the FIG. 6, X axis represents a target discharge temperature, and Y axis represents temperature, the solid line represents the maximum evaporator temperature depending on the temperature of air flowed into the evaporator at the minimum operation of the compressor, and the dotted line represents the conventional target evaporator temperature depending on the outside temperature.

The temperature of the air flowed into the evaporator is, the inside temperature of the vehicle when being an inside mode, or alternatively the outside temperature of the vehicle when being an outside mode.

When a target inside temperature of the vehicle is set up by a user, the target discharge temperature (T1) of a vent is calculated by using those inputted inside and outside temperature and solar radiation, and then the target discharge temperature (T1) of the vent is compared with the maximum evaporator temperature (T2) depending on the temperature of the air flowed into the evaporator at the minimum operation of the compressor to determine a target evaporator temperature by selecting the smaller value.

Referring to the FIG. 6, in conventional arts (dotted line), when the target evaporator temperature is determined to be "{circle around (a)}" that is 3.degree. C., it is lower than the target discharge temperature that is 10.degree. C., therefore the temperature control door is opened to send the air to a heater core so as to elevate the temperature.

However, in the present invention, when the target discharge temperature is determined to be 10.degree. C., and the temperature of the air flowed into the evaporator is 40.degree. C. as in the position of "{circle around (b)}", the target evaporator temperature is set up to be 10.degree. C. and the temperature control door is closed completely.

In the meantime, when the target discharge temperature is set up to be 25.degree. C. and the temperature of the air flowed into the evaporator is 40.degree. C. as in the position of "{circle around (d)}", the maximum evaporator temperature depending on the temperature of the air flowed into the evaporator at the minimum operation of the compressor will be 23.degree. C. as in the position of "{circle around (c)}", and then the maximum evaporator temperature is set up as a target evaporator temperature and the temperature control door is opened to send the air to a heater core so as to elevate the temperature.

It means that when the target discharge temperature is higher than the maximum evaporator temperature at the minimum operation of a compressor by comparing both temperatures, the maximum evaporator temperature is determined as the target evaporator temperature, and when the maximum evaporator temperature at the minimum operation of the compressor is higher, the target discharge temperature of the vent is determined as a target evaporator temperature.

Therefore, unlike the conventional arts, power consumption owing to unnecessary decrease in evaporator temperature can be reduced.

In the above, when the target discharge temperature of a vent is determined as a target evaporator temperature, the temperature control door of an air blower is closed to block the air flowed into the heater core, thereby decreasing the temperature, and when the maximum evaporator temperature at the minimum operation of the compressor is determined as a target evaporator temperature, the temperature control door of an air blower is opened to introduce the air to the heater core, thereby elevating the temperature.

FIG. 7 is a plot, which represents, when the temperature difference between the actual evaporator temperature and target evaporator temperature is more than the acceptable value, a process of correcting the opening degree of the temperature control door.

When setting up the target evaporator temperature (S50) is determined by comparing the target discharge temperature (T1) of the vent and the maximum evaporator temperature (T2) depending on the temperature of the air flowed into the evaporator at the minimum operation of the compressor, after going through the step (S60) of calculating the opening degree of the temperature control door, the determined target evaporator temperature is calculated and outputted as an output value of each operation part. At this stage, when the temperature difference between the target evaporator temperature and the actual evaporator temperature is more than the acceptable value by comparing both of them, the opening degree of the temperature control door is re-calculated, and output value of each operation part is calculated (S80) and outputted (S90). The acceptable value of the temperature difference between the target evaporator temperature and the actual evaporator temperature is preferably less than 4.degree. C.

Hereinafter, another embodiment of the controlling method of an air conditioning system for a vehicle according to the present invention is described.

At first, a user sets up a target inside temperature of the vehicle (S10), and then the inside and the outside temperature of the vehicle and solar radiation detected from a sensor that is mounted on a certain position of the vehicle are inputted (S20). According to those inputted inside and the outside temperature of the vehicle and solar radiation (S20), a target discharge temperature (T1) of a vent is calculated and inputted (S30). On the other hand, the maximum evaporator temperature (T2) is inputted (S40) based on mapping data that have been pre-mapped through performance tests on major control factors. Then, the target discharge temperature (T1) of the vent and the maximum evaporator temperature (T2) are compared each other to select the smaller value, which is determined as a target evaporator temperature (S50). According to the target evaporator temperature, the opening degree of the temperature control door (Temp. Door) is calculated (S60), an output value of each operation part is calculated (S80), and then the resulted output value of the operation part is outputted (S90), or alternatively a target control value of a discharge capacity control valve of a compressor is calculated (S72) with the target evaporator temperature, then the resulted control value is outputted (S73), and the actual evaporator temperature is measured (S74), and the measured value is transmitted to a certain step. The opening degree determined by the target evaporator temperature and the output value of each operation part with the actual evaporator temperature are calculated (S80), and then the calculated output value of each operation part is outputted (S90).

In the above controlling method of an air conditioning system for a vehicle, the steps of calculating the target discharge heat of the vent (S21) and the target discharge of air volume of the vent (S30) may be omitted.

Even if the temperature difference between the target evaporator temperature and the actual evaporator temperature which has been measured by a discharge heat control module is more than the acceptable value that is approximately less than 4.degree. C. by comparing both temperatures, the step (S80) of calculating the output value of each operation part can be carried out right after the step (S60) of calculating the opening degree of the temperature control door determined by the determined target evaporator temperature, while omitting the step (S61) of re-calculating the opening degree of the temperature control door, so as to output the output value of each operation part.

Preferred embodiments of the present invention have been described so far, however, it will be understood by those ordinarily skilled in the art that various modifications or changes may be made thereto without departing from the scope of the present invention that is described by claims attached to this specification.

INDUSTRIAL APPLICABILITY

The controlling method of air conditioning system for vehicles provides excellent control stability against external disturbances and temperature control performance, and reduces the number of constitutional parts since any inputting means (e.g., a circuit or a sensor) for inputting vehicle information is not required.

Further, the present invention optimizes the discharge capacity control by carrying out the capacity control over a compressor with variable capacity depending on the "target discharge temperature", thereby improves the rate of fuel consumption. Additionally, the present invention provides more pleasantly air-conditioned environment by using re-calculation of the opening degree of the temperature door depending on the target evaporator temperature and the actual evaporator temperature.

What is claimed is:

1. A controlling method of air conditioning system for vehicles, the air conditioning system having at least one variable displacement swash plate type compressor and at least one evaporator, wherein the controlling method comprises the steps of:
   (a) setting up a target temperature inside the vehicle determined by a user;
   (b) detecting and inputting temperatures inside and outside the vehicle and solar radiation from sensors mounted on certain positions of the vehicle;
   (c) calculating a target discharge temperature (T1) of a vent by using the target temperature inside, the temperatures inside and outside the vehicle and solar radiation;
   (d) inputting a maximum evaporator temperature (T2), wherein the maximum evaporator temperature (T2) is calculated and inputted depending on the temperature of the air flowed into the evaporator at the minimum operation of the compressor;
   (e) setting up a target evaporator temperature determined by comparing the T1 with the T2 wherein when T1<T2, T1 is determined as the target evaporator temperature and when T1>T2, T2 is determined as the target evaporator temperature;

(f) calculating the opening degree of a temperature control door depending on the target evaporator temperature;

(g) measuring the actual evaporator temperature while controlling the discharge capacity of the at least one variable displacement swash plate type compressor according to the target evaporator temperature, and transmitting the actual evaporator temperature to a certain step;

(h) calculating the opening degree of the temperature control door by using the actual evaporator temperature and the opening degree of the discharge capacity control valve of the compressor determined by the target evaporator temperature; and (i) outputting the calculated opening degree of the temperature control door.

2. The controlling method of air conditioning system for vehicles according to claim 1, further comprising a step of calculating a target discharge heat of a vent, following after the step of detecting and inputting the indoor and the outdoor temperature of a vehicle and solar radiation with referencing to a sensor mounted on a certain position of the vehicle.

3. The controlling method of air conditioning system for vehicles according to claim 2, wherein the air volume of the vent is also calculated in the step of calculating the target discharge temperature of the vent following after the step of calculating a target discharge heat of the vent.

4. The controlling method of air conditioning system for vehicles according to claim 1, further comprising a step of re-calculating the opening degree of the temperature control door following after the step of calculating the opening degree of the temperature control door according to the target evaporator temperature, provided that the temperature difference between the target evaporator temperature and the actual evaporator temperature is more than the acceptable value.

5. The controlling method of air conditioning system for vehicles according to claim 4, wherein the acceptable value of the temperature difference between the target evaporator temperature and the actual evaporator temperature is preferably less than 4.degree. C.

6. The controlling method of an air conditioning system for vehicles according to claim 1, wherein the step of measuring the actual evaporator temperature while controlling the discharge capacity of the compressor according to the target evaporator temperature and transmitting the actual evaporator temperature to a certain step, comprises the steps of: inputting the target evaporator temperature; calculating the target control value for a discharge capacity control valve of a compressor by using the target evaporator temperature; outputting the target control value to the discharge capacity control valve; adjusting the discharge capacity with the discharge capacity control valve and then measuring the actual evaporator temperature; transmitting the actual evaporator temperature to a step following after the step of inputting the target evaporator temperature and the step of calculating the opening degree of the temperature control door.

7. The controlling method of air conditioning system for vehicles according to claim 6, further comprising a step of re-calculating the opening degree of the temperature control door following after the step of calculating the opening degree of the temperature control door according to the target evaporator temperature, provided that the temperature difference between the target evaporator temperature and the actual evaporator temperature is more than the acceptable value.

8. The controlling method of air conditioning system for vehicles according to claim 7, wherein the acceptable value of the temperature difference between the target evaporator temperature and the actual evaporator temperature is preferably less than 4° C.

9. The controlling method of air conditioning system for vehicles according to claim 1, wherein step (f) of calculating the opening degree of a temperature control door depending on the target evaporator temperature further comprises, when the target discharge temperature (T1) of a vent is determined as a target evaporator temperature, the temperature control door of an air blower is closed to block the air flowed into a heater core, and when the maximum evaporator temperature (T2) at the minimum operation of the compressor is determined as a target evaporator temperature, the temperature control door of an air blower is opened to introduce the air to the heater core.

10. A controlling method of air conditioning system for vehicles, the air conditioning system having at least one variable displacement swash plate type compressor and at least one evaporator, wherein the controlling method comprises the steps of:

(a) setting up a target temperature inside the vehicle determined by a user;

(b) detecting and inputting temperatures inside and outside the vehicle and solar radiation from sensors mounted on certain positions of the vehicle;

(c) calculating a target discharge temperature (T1) of a vent by using the target temperature inside, the temperatures inside and outside the vehicle and solar radiation;

(d) inputting a maximum evaporator temperature (T2), wherein mapping data that have been pre-mapped at the minimum operation of the compressor through performance tests on major control factors are used in the input process, (e) setting up a target evaporator temperature determined by comparing the T1 with the T2 wherein when T1<T2, T1 is determined as the target evaporator temperature and when T1>T2, T2 is determined as the target evaporator temperature;

(f) calculating the opening degree of a temperature control door depending on the target evaporator temperature;

(g) measuring the actual evaporator temperature while controlling the discharge capacity of the at least one variable displacement swash plate type compressor according to the target evaporator temperature, transmitting the actual evaporator temperature to a certain step;

(h) calculating the opening degree of temperature control door by using the actual evaporator temperature and the opening degree of the discharge capacity control valve of the compressor determined by the target evaporator temperature; and (i) outputting the calculated opening degree of the temperature control door.

11. The controlling method of air conditioning system for vehicles according to claim 10, wherein the step of measuring the actual evaporator temperature while controlling the discharge capacity of a compressor according to the target evaporator temperature, and transmitting the actual evaporator temperature to a certain step, comprises the steps of: inputting the target evaporator temperature; calculating the target control value for a discharge capacity control valve of a compressor by using the target evaporator temperature; outputting the target control value to the discharge capacity control valve; adjusting the discharge capacity with the discharge capacity control valve and then measuring the actual evaporator temperature; transmitting the actual evaporator temperature to a step following after the step of inputting the target evaporator temperature and the step of calculating the opening degree of the temperature control door.

12. The controlling method of air conditioning system for vehicles according to claim 10, further comprising a step of calculating a target discharge heat of a vent, following after the step of detecting and inputting the indoor and the outdoor temperature of a vehicle and solar radiation with referencing to a sensor mounted on a certain position of the vehicle.

13. The controlling method of air conditioning system for vehicles according to claim 12, wherein the air volume of the vent is also calculated in the step of calculating the target discharge temperature of the vent following after the step of calculating a target discharge heat of the vent.

14. The controlling method of air conditioning system for vehicles according to claim 10 further comprising a step of re-calculating the opening degree of the temperature control door following after the step of calculating the opening degree of the temperature control door according to the target evaporator temperature, provided that the temperature difference between the target evaporator temperature and the actual evaporator temperature is more than the acceptable value.

15. The controlling method of air conditioning system for vehicles according to claim 14, wherein the acceptable value of the temperature difference between the target evaporator temperature and the actual evaporator temperature is preferably less than 4° C.

16. The controlling method of air conditioning system for vehicles according to claim 10, wherein the step (f) of calculating the opening degree of a temperature control door depending on the target evaporator temperature further comprises, when the target discharge temperature (T1) of a vent is determined as a target evaporator temperature, the temperature control door of an air blower is closed to block the air flowed into a heater core, and when the maximum evaporator temperature (T2) at the minimum operation of the compressor is determined as a target evaporator temperature, the temperature control door of an air blower is opened to introduce the air to the heater core.

* * * * *